May 10, 1927.

G. F. KEENA

VALVE CAP

Filed Oct. 13, 1924

1,627,908

Inventor

George F. Keena.

By Thos. F. Donnelly

Attorney

Patented May 10, 1927.

1,627,908

UNITED STATES PATENT OFFICE.

GEORGE F. KEENA, OF DETROIT, MICHIGAN.

VALVE CAP.

Application filed October 13, 1924. Serial No. 743,287

My invention relates to a new and useful improvement in a valve cap and has for its object the provision of a valve cap which will be simple of structure, economical of manufacture and highly efficient in use.

Another object of the invention is the provision of a valve cap so constructed as to, when mounted on a valve stem, form with a valve stem an air-tight seal, so as to prevent leaks through the valve stem.

Another object of the invention is the provision of a valve cap, adapted for use with a threaded valve stem, and having an interiorly threaded surface provided with threads which vary in formation from the threads on the valve stem.

Another object of the invention is the provision of a valve cap adapted for threading on a valve stem, having threads so constructed and arranged that upon forcible threading on the valve stem, the threads of the stem and the cap will flow together for the purpose of sealing the connection between the stem, so as to make it airtight.

Another object of the invention is the provision of a valve cap, adapted for threading on a valve stem, the cap being provided with a tapered interiorly threaded pocket, the threads on the cap being dissimilar from the threads on the stem.

Another object of the invention is the provision of a valve cap adapted for threading on a valve stem, said cap being made from comparatively soft material and provided with threads on its inner surface dissimilar from the exterior surface of the valve stem, so that, upon a threading of the cap on to the valve stem, a flowing of the threads of the cap will take place to securely seal the connection between the stem threads and the cap threads.

Another object of the invention is the provision of a valve cap, adapted for threading on a valve stem having a shoulder positioned on its outer surface, said cap being adapted for flowing around said shoulder upon a threading into engagement with the same to form a sealing connection between the shoulder and the edge of the cap, to provide an airtight joint.

Other objects will appear hereinafter.

The invention consists in the combination and arrangement of parts hereinafter described and claimed.

Figure 1:
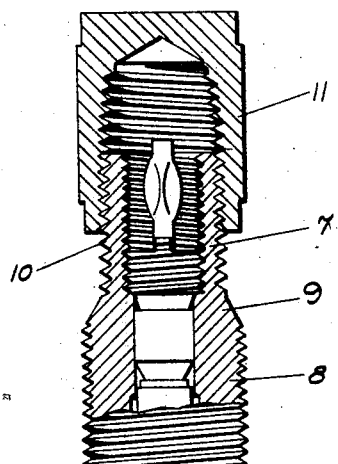
Figure 2:
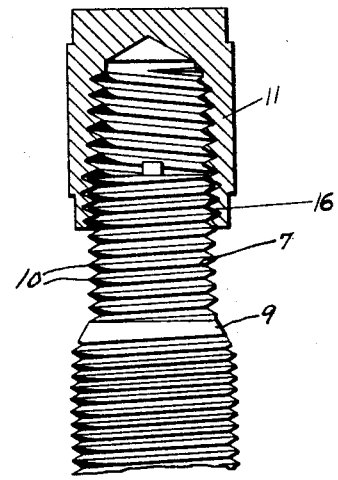
Figure 3:
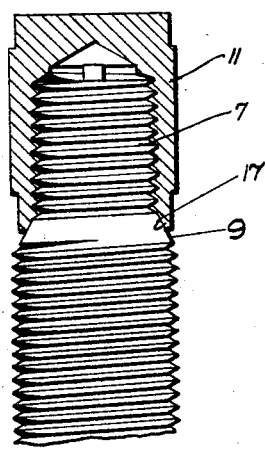
Figure 4:
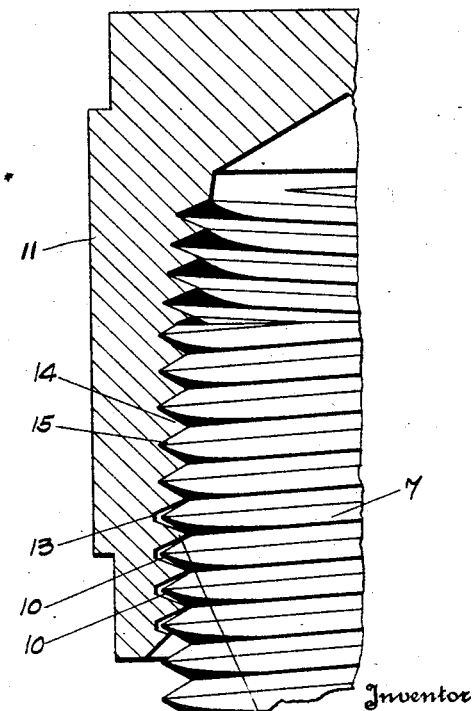

The invention will be best understood from a reference to the accompanying drawings which form a part of this specification and in which, Fig. 1 is a vertical central sectional view of the invention threaded on a valve stem, Fig. 2 is a vertical central sectional view of a modified form of the invention, Fig. 3 is a vertical central sectional view of the valve cap threaded into engagement with the shoulder of the valve stem, Fig. 4 is an enlarged fragmentary sectional view illustrating the co-operation of the threads of the cap and the valve stem.

The invention is adapted for use with valve stems which are now customarily used with pneumatic tires, the valve stem being the means for conducting the air into the tube to be inflated. With valve stems of this class, the upper portion 7 of the valve stem 8 is reduced so as to provide a shoulder 9 on the stem. The reduced portion 7 is provided with threads 10 upon which a valve cap may be positioned. These threads are straight and usually 60 degree threads. The cap which is provided for the threading on the reduced portion 7 comprises a cup-shaped body 11 having the interior thereof tapered so that the walls converge toward the base of the cup, this taper being a proper degree to be determined by the manufacturer, according to the size and amount of sealing desired between the cap and the stem. The interior of the cap is provided with a taper thread. The degree of taper may vary but I prefer to use approximately a fifty degree taper thread when the valve stem is provided with a sixty degree straight thread. It is preferred that the cap 11 be made from some material which is softer than the material from which the valve stem is made. Upon threading the cap 11 onto the reduced portion of the stem, the threads, when engaging, will permit a turning of the cap a small amount without the use of any tool, this amount of turning being sufficient to retain the cap on the valve stem. A suitable tool, such as a pair of pliers, may then be used to give the cap a couple of turns onto the stem. When the threads first engage the outer edge 12, the threads of the cap will engage against the lower surface of the groove between the threads 10 of the valve stem 7. This will leave a slight space 13 between the outer edge of the threads on the valve stem and the base of the groove between the threads of the cap. As the cap is threaded farther onto the stem, on account of the dissimilarity between the threads of the cap and the threads of the stem, the threads of the cap will be caused to flow, so as to fill up the space between the threads of the stem, as shown in the interlocking threads 14 and 15 in Fig. 4. When the threading has taken place to such an extent as to cause a flowing of the threads on account of the dissimilarity of the threads, the juncture between the threads of the cap and the threads of the stem becomes a close one, so as to make it entirely airtight, the engagement being so close as to resemble very closely a welding of the joining parts.

In Fig. 2, I have shown a portion 16 of the cap 11' provided with parallel walls on the inner surface, these parallel walls terminating in converging walls which converge toward the base of the cap, so that the inner surface of the cap presents a tapered surface for a portion of its distance, the extreme outer portion 16 thereof being parallel with the exterior of the side walls.

When the cap 11 is provided with a tapered bore and threaded upon the stem 7, it is evident that, if the threads of the cap are to interlock with the threads of the stem, the interior surface of the cap which is threaded on the stem will have to conform with the walls of the threaded portion of the stem, so that that portion of the cap, which is once threaded on the valve stem loses its tapered formation, the interior surface of this threaded-on portion being parallel with the exterior surface of the cap. To bring about this malformation of the interior surface of the cap place the threads of the interior surface which are in engagement with the exterior threads of the portion 7 of the valve stem under a strain and it is this strain which brings about the close engagement of the threads to form a sealing connection. It is evident, therefore, that after the cap has once been threaded on the valve stem, a certain portion and removed therefrom, it will be necessary, in order to bring about the existence of this strain between the cap and the valve stem, that the cap be threaded on a slight distance farther than it was threaded on the valve stem before its removal.

After the valve cap has been removed and replaced a sufficient number of times, all of the threads of its interior will have been threaded onto the valve stem and in order to form a sealing connection, the threads are sufficiently long to permit the lower edges of the cap to engage against the shoulder 9 of the valve stem 10. The metal being comparatively soft, will, upon a threading of the cap onto the valve stem, after engagement of the edges with the shoulder, flow so as to seat itself firmly on the outer surface of the shoulder 9 to form an airtight joint at that place.

If desired, the mouth of the cap may be countersunk, as at 17, as shown in Fig. 3. This countersinking of the mouth of the cap will facilitate the flowing of the metal around the shoulder 9 to assist in forming a firm seat.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. A valve cap adapted for threading on an exteriorly threaded valve stem, said cap being made from comparatively soft material and provided with interior threads adapted for engaging said exterior threads, said threads being dissimilar in formation and pitch, to permit the flowing of the threads of said cap into close engagement with the threads of said stem.

2. A valve cap adapted for threading on an exteriorly threaded valve stem formed from comparatively soft material and provided with interior threads adapted for co-operation with said exterior threads, said threads being of dissimilar relative formation to provide a strain between the cap and said stem upon a theading of said cap on to said stem.

3. A valve cap adapted for threading on an exteriorly threaded valve stem, said cap being formed from comparatively soft material and provided with interior threads adapted for engagement with said exterior threads, said threads being of relative dissimilar formation to provide a strain between said parts when in threaded relation; and a shoulder on said stem, said cap being adapted for threading into engagement with said shoulder and for flowing around the stem upon continued threading to provide an airtight joint between said shoulder and the engaging portion of said cap.

In testimony whereof, I have signed the foregoing specification.

GEORGE F. KEENA.